Figure 1:
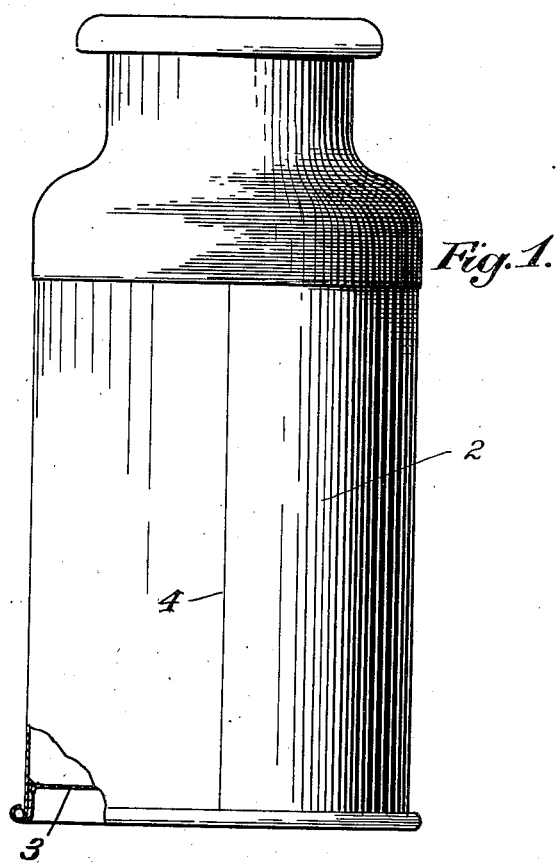

Jan. 9, 1923.

J. B. CONOVER.
MILK AND ICE CREAM CAN AND METHOD OF MAKING THE SAME.
FILED JAN. 17, 1921.

1,441,484

Patented Jan. 9, 1923.

1,441,484

UNITED STATES PATENT OFFICE.

JACOB B. CONOVER, OF JERSEY CITY, NEW JERSEY.

MILK AND ICE-CREAM CAN AND METHOD OF MAKING THE SAME.

Application filed January 17, 1921. Serial No. 437,761.

*To all whom it may concern:*

Be it known that I, JACOB B. CONOVER, a citizen of the United States, residing at Jersey City, in the county of Hudson and State of New Jersey, have invented certain new and useful Improvements in Milk and Ice-Cream Cans and Methods of Making the Same, of which the following is a specification.

This invention relates particularly to shipping cans for milk products, such as milk, cream, and ice cream, the object thereof being to provide an improved can of this kind having rust-proof joints or seams. These cans, as is well known, are usually made from sheet iron or sheet steel, and shaped into a cylindrical body with their edges connected in some suitable manner and the bottom likewise attached in a suitable manner, but great difficulty has been experienced in making the joints of the body and bottom rust-proof; in other words, in making a sanitary tight joint.

It is a well known fact that one drop of foul milk will contaminate and foul the entire can of many gallons of milk in a short space of time, and consequently a can of this kind is unsanitary practically as soon as rust forms at any point along the joint, since small particles and milk acid particularly accumulate at these points, making it difficult to properly cleanse the can and keep the same in a sanitary condition.

It has been the practice heretofore, in making these cans, to make the body from sheet iron or sheet steel and shape it into a cylindrical form and either before such shaping or thereafter tinning or galvanizing the same and the bottom, and connecting the edges of the body and the bottom to the body in various ways. In some instances the joints have been made by punching and riveting the overlapping edges of the metal and then the metal, if not previously tinned or galvanized, is thus treated.

In other instances, the joints have been made by welding the adjacent edges together and then the parts tinned or re-tinned, but great difficulty has been experienced in obtaining a rust-proof joint in this manner by reason of the fact that the welded seams or joints do not take the tinning or galvanized coating and experience has shown that the cans rust at such joints, it being extremely difficult to obtain a smooth sanitary surface at such joints in this way. Moreover, joints formed in this manner as well as those formed by riveting present a more or less roughened surface, difficult to keep clean, and affording opportunity for rust attacks.

In forming the joint by the welding process, it has been found that the welding step disturbs the surface of the metal at the adjacent edges to such an extent that it leaves it in a comparatively rough condition, so that the welded joint does not take the tinning or coating as effectively and efficiently as is the case with the main body of the can where the particles of the metal have been undisturbed by the welding heat. Consequently, as the tinning or coating inefficiently protects the joint, it leaves it open to attack by rust and therefore, even with great care in cleansing the can, rust quickly forms along and near the joint or seam.

The object of the present improvement therefore, is to provide a milk or ice cream can formed of sheet iron or sheet steel, in which the seams or joints are so constructed that they are smooth and sanitary and practically rust-proof, and in consequence can be readily cleansed and maintained always in a thoroughly sanitary condition.

Figure 2:
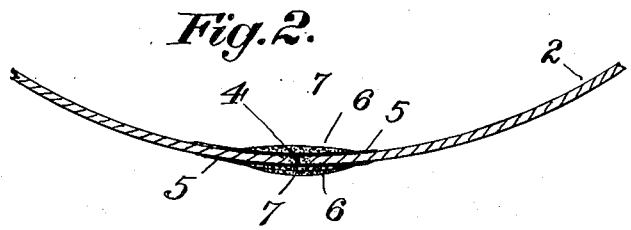

In the drawings accompanying and forming a part of this specification, Fig. 1 illustrates a milk can having the body joint and the bottom joint constructed in accordance with the present improvement; and Fig. 2 is a sectional view of the body joint illustrating the present improvement.

Similar characters of reference indicate corresponding parts in the several figures of the drawings.

As hereinbefore stated, the object of the present improvement is to provide a smooth, rust-proof, sanitary joint, and in carrying out the present improvement, the sheet iron or sheet steel of which the can is to be made is suitably shaped to provide a cylindrical body 2, a bottom 3, and then the joint formed by the shaping of the body or the attaching of the bottom thereto is suitably welded by electricity or by the oxy-acetylene gas method, this weld being indicated in Fig. 2 by the reference character 4. The can is then coated with a softer metal in any suitable way, as by dipping it in a molten bath of tin or zinc or whatever it is desired to use as a coating material, this usually being tin, and which is indicated in Fig. 2 by the reference character 5. Then the joint for an appreciable distance at each side thereof, is recoated with a suitable soldering material, as 6, or with some suitable material softer than the base metal thereby forming a smooth and sanitary joint, which will effectively prevent rusting at any point along the joint, since the first coating of tin which has been found ineffective to protect a welded joint so that it becomes rusted at points along the joint is thoroughly covered by a material of relatively greater thickness at the joint, as at 7, and this coating material gradually tapers off at each side of the joint so that a smooth joint is obtained, which is sanitary and rust-proof. This treatment, while usually given to the inside of the can, may also be applied to the outside of the joint when desired.

By this method of procedure, the edges are thoroughly and efficiently connected, not only against severance but a strong and durable joint is provided, the strength of the joint being practically greater than the rest of the can while at the same time a very smooth sanitary joint is obtained, which will be free from attacks of rust or oxidation.

The present improvement has therefore to do particularly with the construction of the joints of milk and ice cream cans adapted for shipping purposes in which it is desirable to weld the joints instead of riveting them, since a welded joint presents a much smoother and more easily cleaned surface than a riveted one, and therefore, in carrying out this improvement, the joint as hereinbefore stated, is first continuously welded along the seam either with or without a suitable filling material, and either butt-welded or lap-welded as occasion may require, subsequent to which the joint is tinned or coated with a suitable tinning material, and then this joint is soldered or coated by suitable material to an appreciable distance at each side of the welded joint, thus making not only a reinforced joint but a smooth and sanitary one, in which it is not possible for the joint to become oxidized or in any way attacked by impurities, since it is not possible for the tin coating to become perforated and there are no rough pockets or places for impurities or particles of rust to settle or accumulate.

Of course it will be understood that where the milk can is made with an attached breast the joint of the breast and body is likewise formed in the manner just described.

I claim as my invention:

1. The method of forming joints in cans of the class described, which consists in first continuously welding the edges of the joint, then coating the same with a suitable material, and then soldering the joint over the coating thereby to form a reinforced and protected joint.

2. The method of forming joints in cans of the class described, which consists in first continuously welding the edges of the joint, then coating the same with a suitable material, and then soldering the joint over the coating thereby to form a reinforced and protected joint having increased thickness at the joint and tapering into the body of the can at each side thereof.

3. The methods of making a joint for milk and ice cream cans, which consists in first welding the contiguous edges of the joint all along the same, then coating the joint with a suitable tinning material, and then coating the same to an appreciable distance at each side of the joint with a suitable soldering material.

4. The method of making a joint for milk and ice cream cans, which consists in first welding the contiguous edges of the joint all along the same, then coating the joint with a suitable tinning material, and then coating the same to an appreciable distance at each side of the joint with a suitable soldering material, the soldering material having increased thickness at the joint and decreased thickness at each side of the joint.

5. The method of making a joint for milk and ice cream cans, which consists in first welding the contiguous edges of the joint all along the same, then coating the joint with a suitable tinning material, and then coating the same to an appreciable distance at each side of the joint with a suitable soldering material, the soldering material having increased thickness at the joint and gradually decreased thickness at each side of the joint.

6. The method of making a joint for milk and ice cream cans, which consists in first welding the contiguous edges of the joint all along the same, then coating the joint with a suitable tinning material, and then coating the same both inside and outside of the can with a suitable soldering material.

7. The method of making a joint for milk and ice cream cans, which consists in first welding the contiguous edges of the joint all along the same, then coating the joint with a suitable tinning material, and then coating the same both inside and outside of the can with a suitable soldering material having increased thickness at the joint and gradually decreased thickness at each side thereof.

8. A milk or ice cream can having a welded and tinned joint protected by suitable soldering material.

9. A milk or ice cream can having a welded and tinned joint protected by suitable soldering material of relatively increased thickness at the joint.

10. A milk or ice cream can having a welded and tinned joint protected by suitable soldering material of relatively increased thickness at the joint and of less thickness at each side of the joint.

11. A milk or ice cream can having a welded and tinned joint protected by suitable soldering material of relatively increased thickness at the joint and of gradually decreased thickness at each side of the joint.

12. A milk or ice cream can having a welded and tinned joint protected by suitable soldering material of relatively increased thickness at the joint and of gradually decreased thickness at each side of the joint, said soldering material extending at each side of the joint an appreciable distance therefrom.

13. A milk or ice cream can having its edges continuously welded and covered by a suitable tinning material, said joint being protected on the inside and outside by a suitable soldering material extending an appreciable distance to each side of the joint thereby to form a smooth, sanitary and rust-proof joint.

Signed at Clifton Springs, Ontario County, New York, this 14th day of January, 1921.

JACOB B. CONOVER.